F. UHRLAND.
Beer Cooler.
No. 50,055.
Patented Sept. 19, 1865.
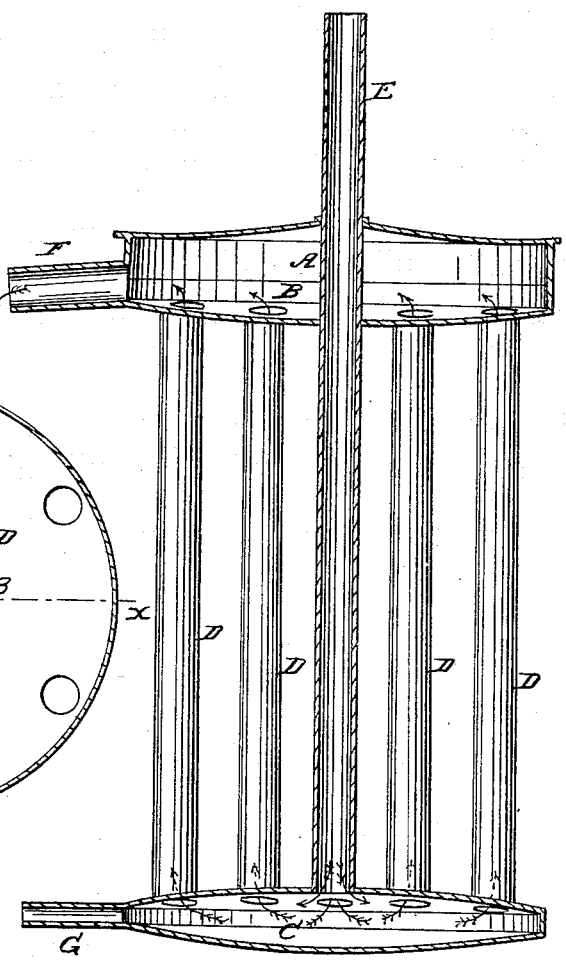
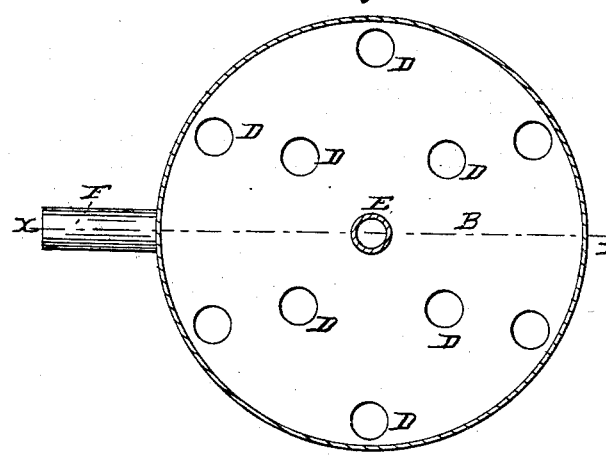

UNITED STATES PATENT OFFICE.

FRANCIS UHRLAND, OF BUFFALO, NEW YORK.

IMPROVED BEER-COOLER.

Specification forming part of Letters Patent No. 50,055, dated September 19, 1865.

*To all whom it may concern:*

Be it known that I, FRANCIS UHRLAND, of the city of Buffalo, county of Erie, and State of New York, have invented a new and Improved Apparatus for Cooling Beer; and I do hereby declare that the following is a full and exact description of the same, reference being had to the accompanying drawings, and to the letters of reference marked thereon.

The nature of my invention consists in securing a series of pipes or tubes, which I usually make of copper, to two corresponding heads or ends made in an oval form, into which the beer is passed through the main tube and returns through tubes to the upper head, from which it passes off to a proper receptacle.

To enable others skilled in the art to make and use my invention, I will proceed to describe its construction and operation.

Figure I is a longitudinal vertical section taken from the line X X. Fig. II is a plan of the inside of the two corresponding heads of my improved apparatus.

A represents the cover of the upper head or end. This cover is made so that it may be readily removed for the purpose of cleansing out the tubes when they become rancid or foul from long use.

B is the upper head or end, and C the lower head. Both these heads are made with chambers, as seen in the drawings. E is the main tube, into which the beer is introduced and through which it passes down into the lower head or end, C, from thence up through the tubes D D D D in the direction of the arrows into the upper head, B, from which it passes off through the eduction-pipe F into a proper receptacle.

G is a pipe provided for the purpose of drawing off the surplus beer remaining in the apparatus after the quantity to be cooled has passed through. This pipe is provided with a stop-cock or plug, which is not shown in the drawings or model, as it is no part of my invention.

The advantage of my invention will readily manifest itself when it is observed that it is very simple and durable in its construction and use and may be made to suit and accommodate the capacity of the most extensive or the smallest brewery, as it may be made so as to set in a keg, barrel, or hogshead filled with ice or cold water.

The operation is simple, and is performed by the attendant placing the apparatus in a vessel of ice or cold water, and pouring the beer into the tube E, it is circulated through the pipes, which are submerged in the ice, when it soon becomes cold.

Having thus described my invention, what I claim as new, and desire to secure by Letters Patent, is—

1. A beer-cooler with an adjustable cover, substantially as and for the purposes herein described.

2. The main tube E and the cover A, in combination with tubes or pipes D D D D, heads B and C, substantially and for the purposes herein set forth.

FRANCIS UHRLAND.

Witnesses:
　ALBERT KRAUSSE,
　O. W. SEELY.